US012679295B2

(12) United States Patent
Freienstein et al.

(10) Patent No.: US 12,679,295 B2
(45) Date of Patent: Jul. 14, 2026

(54) HIERARCHICAL SYSTEM ARCHITECTURE FOR CONTROLLING AN AUTOMATED VEHICLE

(71) Applicant: Robert Bosch GmbH, Stuttgart (DE)

(72) Inventors: Heiko Freienstein, Weil Der Stadt (DE); Johannes Christian Mueller, Stuttgart (DE); Maxim Dolgov, Renningen (DE); Ralf Kohlhaas, Calw (DE)

(73) Assignee: ROBERT BOSCH GMBH, Stuttgart (DE)

( * ) Notice: Subject to any disclaimer, the term of this patent is extended or adjusted under 35 U.S.C. 154(b) by 3 days.

(21) Appl. No.: 18/823,879

(22) Filed: Sep. 4, 2024

(65) Prior Publication Data

US 2025/0091533 A1      Mar. 20, 2025

(30) Foreign Application Priority Data

Sep. 19, 2023    (DE) ..................... 10 2023 209 058.9

(51) Int. Cl.
  *B60W 60/00*        (2020.01)
  *B60R 16/023*       (2006.01)
(52) U.S. Cl.
  CPC ..... *B60R 16/0232* (2013.01); *B60W 60/0015* (2020.02)
(58) Field of Classification Search
  CPC .............. B60R 16/0232; B60W 30/08; B60W 30/18109; B60W 40/105; B60W 50/0098;
      (Continued)

(56) References Cited

U.S. PATENT DOCUMENTS

| | | | | |
|---|---|---|---|---|
| 12,442,896 | B2 * | 10/2025 | Buerkle | ................. G01S 17/86 |
| 2009/0062979 | A1 * | 3/2009 | Sakane | ................. B60W 50/04 |
| | | | | 701/48 |

(Continued)

FOREIGN PATENT DOCUMENTS

| | | |
|---|---|---|
| DE | 102017217256 A1 | 3/2019 |
| DE | 102019201491 A1 | 8/2020 |

OTHER PUBLICATIONS

ISO 26262-1:2018 Standard, "Road Vehicles—Functional Safety—Part 1: Vocabulary," 2018, pp. 1-42.
(Continued)

*Primary Examiner* — Ce Li Li
(74) *Attorney, Agent, or Firm* — NORTON ROSE FULBRIGHT US LLP

(57)      ABSTRACT
A hierarchical system architecture for controlling an automated vehicle. The hierarchical system architecture includes: a performance layer; a safety layer; a hardware layer, wherein the safety layer is arranged between the performance layer and the hardware layer; the performance layer is configured to generate a first control signal and to transmit it to the safety layer; the safety layer is configured to detect whether a safety-critical driving situation is present for the vehicle, and a first system reaction is to be carried out to bring the vehicle into a safe state by transmitting a corresponding second control signal to the hardware layer instead of the first control signal, and the safety layer includes at least one detector module which detects whether a special case is present in the safety-critical driving situation of the vehicle which requires an associated second system reaction instead of the first system reaction.

4 Claims, 1 Drawing Sheet

(58) Field of Classification Search
CPC .......... B60W 60/001; B60W 60/0011; B60W
60/0015; B60W 2050/0006; B60W
2556/40
See application file for complete search history.

(56)                              References Cited

U.S. PATENT DOCUMENTS

| | | | |
|---|---|---|---|
| 2014/0129100 A1* | 5/2014 | Nellums | B60W 10/10 |
| | | | 477/115 |
| 2020/0005056 A1* | 1/2020 | Notheis | G08G 1/163 |
| 2021/0316758 A1* | 10/2021 | Oboril | B60W 30/146 |
| 2022/0063601 A1* | 3/2022 | Hering | B60R 21/0134 |
| 2022/0197236 A1* | 6/2022 | Krawiec | G06F 11/3013 |
| 2024/0272640 A1* | 8/2024 | Lempia | G08G 5/21 |

OTHER PUBLICATIONS

ISO 21448:2019 Standard, "Road Vehicles—Safety of the Intended Functionality," 2019, pp. 1-64.

* cited by examiner

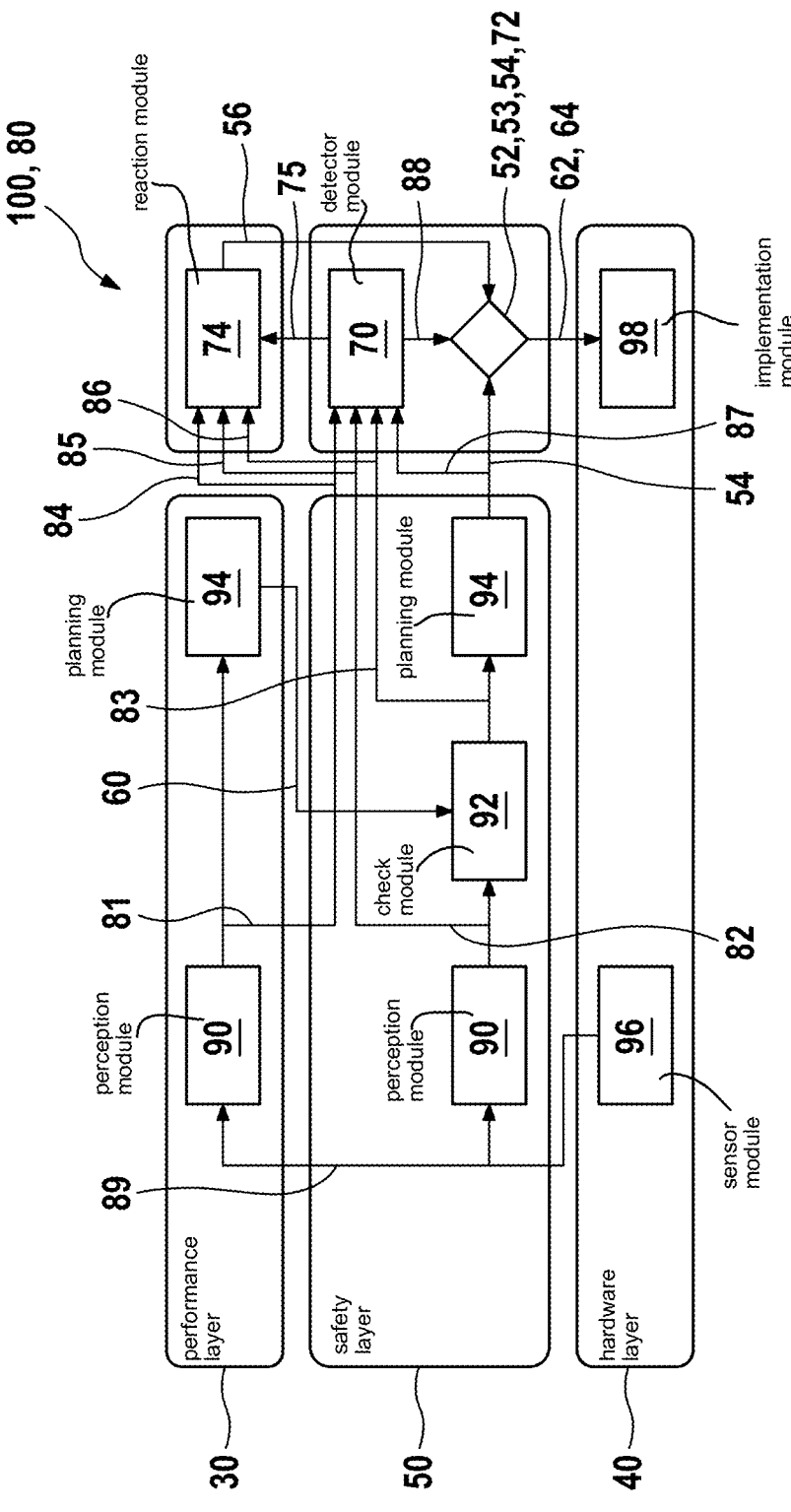

HIERARCHICAL SYSTEM ARCHITECTURE FOR CONTROLLING AN AUTOMATED VEHICLE

CROSS REFERENCE

The present application claims the benefit under 35 U.S.C. § 119 of German Patent Application No. DE 10 2023 209 058.9 filed on Sep. 19, 2023, which is expressly incorporated herein by reference in its entirety.

FIELD

The present invention relates to a hierarchical system architecture for controlling an automated vehicle.

BACKGROUND INFORMATION

Automated vehicles require system architectures that allow safe degradation of behaviors if errors occur or the performance path no longer finds a valid solution. While various solution approaches already exist for errors in the sense of ISO 26262 Functional Safety, most existing system architectures do not take into account errors in the sense of ISO21448 Safety of the Intended Functionality.

SUMMARY

It is an object of the present invention to provide a solution to improve a system architecture for automated vehicles.

This object may be achieved by a hierarchical system architecture for controlling an automated vehicle having certain features of the present invention.

According to a first aspect, the present invention relates to a hierarchical system architecture for controlling an automated vehicle. According to an example embodiment of the present invention, the hierarchical system architecture includes:

a performance layer, a safety layer, a hardware layer, wherein the safety layer is arranged between the performance layer and the hardware layer, wherein the performance layer is configured to generate a first control signal and to transmit it to the safety layer, wherein the safety layer is further configured to detect whether a safety-critical driving situation is present for the vehicle and a first system reaction is to be carried out in order to bring the vehicle into a safe state by transmitting a corresponding second control signal to the hardware layer instead of the first control signal, and wherein the safety layer further comprises at least one detector module which is configured to detect, on the basis of an evaluation by means of at least one evaluation criterion, whether an special case is present in the safety-critical driving situation of the vehicle, which special case requires an associated second system reaction instead of the first system reaction in order to achieve the safe state of the vehicle by transmitting a corresponding third control signal to the hardware layer instead of the second control signal.

A feature of the present invention is to provide a hierarchical system architecture for an automated vehicle, which architecture promises a high degree of robustness and safety in the sense of ISO 26262 and ISO 21448, but also allows a strongly pronounced, secured main path for high-performance driving. This is made possible by a hierarchical system architecture having a number of layers, which provides conventional top-down safety, i.e., a cascade of fall-back behavior, for a main signal processing path, and, in a manner essential to the present invention, provides a so-called bottom-up safety mechanism which provides and secures special solutions for special cases or special driving scenarios or driving situations of the vehicle.

On the one hand, the top-down safety path provides fallback behavior in case a lower layer of the hierarchical system architecture cannot execute an action preferred by the higher layer, such as a behavior, driving path, trajectory, control signal, etc. On the other hand, unsafe behavior is discarded across the individual layers so that only safe behavior is executed. In this case, the hierarchical system architecture is configured in such a way that no unsafe behavior is allowed to persist, for example by optimizing for no false negative scenarios. During processing, it may therefore be the case that a layer determines that none of the candidate actions can be carried out, in which case only a fail-safe behavior such as emergency braking can be carried out, which is not always the best reaction (e.g., in the case of an imminent collision with a pedestrian) when evasive action would be the better solution. This is where the present invention comes in.

For the bottom-up safety mechanism, so-called detection modules, detector modules or detectors and reaction modules are provided in all layers of the layered architecture parallel to the main signal path.

The detectors have the task of detecting special driving situations or special cases for driving situations for the vehicle for which a specific system reaction is intended which can no longer be handled at the relevant layer of the system architecture via the top-down safety of the main signal path.

In accordance with an example embodiment of the present invention, the detectors are safeguarded separately, independently of the main signal path, and are triggered only when a very specific special situation occurs for the vehicle. The detectors are therefore typically configured to avoid false positives and not, as in the top-down signal path or otherwise, to avoid false negatives.

According to an example embodiment of the present invention, each detector is assigned exactly one reaction module, which is activated thereby in the detected special situation or in the detected special case of a driving situation of the vehicle. A reaction module is always assigned to exactly one layer of the hierarchical system architecture, but can be activated by a plurality of detectors in different layers.

The corresponding system reaction is therefore also embedded in the layer architecture as a reaction module in each case. It is therefore also safeguarded separately, independently of the main signal path.

The hierarchical system architecture of the present invention makes the following advantages possible:

An existing hierarchical layer architecture for efficient and safety-triggered control of a vehicle is efficiently extended and improved because the bottom-up safety mechanism makes it possible to easily combine or integrate complex functionality with a high safety load for defined special cases or driving situations of the vehicle.

The hierarchical system architecture of the present invention is designed in such a way that the safety guarantees increase successively in a top-down signal flow, whereas in a bottom-up signal flow a complete coverage of the entire ODD (Operational Design Domain) no longer needs to be ensured. This simplifies the implementation and execution of a hierarchical system architecture.

The hierarchical system architecture of the present invention allows explicit separation of the main signal processing path and the treatment of special cases or special driving situations of the vehicle. In this way, tasks of varying complexity can be processed efficiently.

Furthermore, the hierarchical system architecture of the present invention also results in advantages for the development and implementation of, for example, vehicle-relevant, controllable systems, which also implement partially autonomously controlled functions based on this software architecture:

Compact detectors can be developed and tested in a short time and their functionality can be scaled incrementally.

In the event of special cases or unusual driving scenarios occurring in the field, safety mechanisms in the form of one or more application-specific detector-reaction module pairs can also be added quickly, for example via a corresponding system update.

Furthermore, a basic structure for a hierarchical layer architecture for a system can be quickly and easily extended by adding different detectors specifically for different ODDs, such as highway, city, depot, etc. Due to the strong restriction of activation by the detector, negative side effects can also be excluded in a comprehensible manner from an approval perspective.

Pairs of detector and reaction modules can also be adopted as functions in later versions of the main signal path or main signal path or used to train ML components used in the main signal path, so that the detected special cases are proactively avoided in the later system and occur less frequently or not at all.

The present invention with the bottom-up triggered safety mechanism is independent of a concrete layer architecture or a hierarchical system architecture for a vehicle or another technical system to be controlled. For example, a conventional NASREM system architecture can be used as the corresponding architecture.

A possible example embodiment of the hierarchical system architecture of the present invention provides that the first system reaction is triggered based on the result of a validity check of the received first control signal. This has the advantage that the system architecture reacts efficiently and in an application-oriented manner.

One possible example embodiment of the hierarchical system architecture of the present invention is that at least one evaluation criterion provides whether the first system reaction is sufficient to bring the vehicle into a safe state. This has the advantage that an adequate safety level can be achieved for a detected driving situation of the vehicle.

One possible example embodiment of the hierarchical system architecture of the present invention provides that the detector module is configured to access the at least one performance layer in order to obtain information which is used in the evaluation of the safety-critical driving situation of the vehicle. This has the advantage that a driving situation of the vehicle can be precisely specified in order to efficiently decide which system reaction is appropriate.

One possible example embodiment of the hierarchical system architecture of the present invention provides that the second system reaction is carried out by a reaction module which is connected via signals to the detector module. This has the advantage of allowing the detector module and reaction module to be assigned efficiently.

One possible example embodiment of the hierarchical system architecture of the present invention provides that the reaction module corresponding to the detector module is arranged on a different layer of the system architecture than the detector module itself. This has the advantage that the detector module reflects or converts the signal flow back to a higher layer and allows for efficient separation or division into specific special cases of vehicle driving situations for which there is a concrete, safeguarded system reaction which has a complexity appropriate to this reaction.

One possible example embodiment of the hierarchical system architecture of the present invention provides that the reaction module is located on a layer of the system architecture arranged above a layer on which the detector module is located. This has the advantage that the detector module reflects or converts the signal flow back to a higher layer and allows for efficient separation or division into specific special cases of vehicle driving situations for which there is a concrete, safeguarded system reaction which has a complexity appropriate to this reaction.

According to a second aspect, the present invention relates to a computer program containing machine-readable instructions which, when executed on one or more computers and/or compute instances, cause the computer(s) or compute instance(s) to execute or control the system architecture according to the present invention.

According to a third aspect, the present invention relates to a machine-readable data carrier and/or download product comprising the computer program.

According to a fourth aspect, the present invention relates to one or more computers and/or compute instances with the computer program and/or with the machine-readable data carrier and/or the download product.

Further measures improving the present invention are explained in more detail below, together with the description of the preferred exemplary embodiments of the present invention, with reference to the FIGURE.

BRIEF DESCRIPTION OF THE DRAWINGS

FIG. 1 is a schematic representation of a hierarchical system according to an example embodiment of the present invention.

DETAILED DESCRIPTION OF EXAMPLE EMBODIMENTS

FIG. 1 is a schematic representation of a hierarchical system 100 according to an embodiment of the present invention.

The hierarchical system architecture 100 for controlling an (automated) vehicle 80 has a performance layer 30, a safety layer 50 and a hardware layer 40. The present invention is not limited to any particular layer model or layer architecture. The vehicle or, in general, the technical system 80 may have automated functionalities, but it does not have to.

The safety layer 50 is arranged between the performance layer 30 and the hardware layer 40.

The performance layer 30 is configured to generate a first control signal 60 and to transmit it to the safety layer 50. The performance layer 30 may in turn contain a plurality of layers or sub-layers.

The safety layer 50 is further configured to detect whether a safety-critical driving situation 52 is present for the vehicle 80 and a first system reaction 54 is to be carried out in order to bring the vehicle 80 into a safe state. For this purpose, a corresponding second control signal 62 is transmitted to the hardware layer 40 instead of the first control signal 60.

According to FIG. 1, the safety layer 50 further comprises a detector module 70 which is configured to detect, on the basis of an evaluation by means of at least one evaluation criterion 72, whether an special case 53 is present in the safety-critical driving situation 52 of the vehicle 80, which special case requires an associated second system reaction 56 instead of the first system reaction 54 in order to achieve the safe state of the vehicle 8. For this purpose, a corresponding third control signal 64 is then transmitted to the hardware layer 40 instead of the second control signal 62.

Optionally, the first system reaction 54 can be triggered based on a result of a validity check of the received first control signal 60. This means that a check is performed to determine whether the first control signal 60 is valid.

Optionally, it can be provided that at least one evaluation criterion 72 provides or makes a statement as to whether the first intended system reaction 54 is sufficient to bring the vehicle 80 into the safe state or to bring the vehicle into a safe state corresponding to the detected driving situation.

Optionally, the detector module 70 can be designed to access the at least one performance layer 30 in order to obtain corresponding information 75 which is used in the evaluation of the safety-critical driving situation 52 of the vehicle 80. This can, for example, be access to an environment model that is stored in the performance layer 30.

Optionally, the second system reaction 56 can be carried out by a reaction module 74 which is connected via signals to the detector module 70. The present invention may further include a plurality of detector modules 70 and reaction modules 74.

Optionally, the reaction module 74 corresponding to the detector module 70 is arranged on a different layer of the system architecture 100 than the detector module 70 itself.

Optionally, the reaction module 74 is located on a layer of the system architecture (100) arranged above a layer on which the detector module 70 is located. In the embodiment of FIG. 1, the reaction module 74 corresponding to the detector module is located on the performance layer 30 arranged above the safety layer 50 on which the detector module 70 is located.

This means that the solution approach according to the present invention differs from the normal top-down safety structure in conventional system layer architectures in which the problem is always solved in the same layer.

Figuratively speaking, the detector module 70 reflects the signal flow back to a higher layer and allows for safety-related separate processing of very specific special cases of vehicle situations for which there is a concrete, safeguarded system reaction and which has a complexity appropriate for this reaction. In this case, the reaction module 74 is always assigned to exactly one layer of the architecture, but it can be activated by a plurality of detector modules in different layers of the system architecture 100.

With regard to the safety load in the hierarchical system architecture 100 according to the present invention, the following aspects are also important:

In the main signal processing path, the safety load increases along the layers from the top (performance layer 30) to the bottom (hardware layer 40). This also applies to the detector modules 70. The reaction modules 74, on the other hand, have an individual safety load, which in each case depends on which system reaction they execute.

On the other hand, the complexity of the functionality decreases from the top (performance layer 30) to the bottom (hardware layer 40), so that the decreasing complexity further simplifies the system-technical safeguarding. This makes it possible to continue to provide appropriate protection even for layers with a very high safety load.

The detector modules 70 check, on the basis of clearly defined evaluation criteria 72, which can be derived from the safety argumentation and verified and validated in corresponding test cases, whether the first system reaction 54 is sufficient to bring the vehicle 80 into a safe state appropriate to the driving situation.

The safeguarding of a detector or detector module 70 is thus comparable to the safeguarding of a driver assistance function, in which a safety-critical false positive must demonstrably not occur. Verification and validation procedures for this are available, so that a correspondingly high level of safety can be achieved for a detector module 70.

If the detector module 70 is not located on the lowest layer, the second system reaction 56 triggered thereby can either overwrite the layers therebelow or feed the result of the second system reaction 56 into a layer therebelow.

The first variant allows for greater flexibility, but on the other hand also increases the protection requirements.

The second variant benefits from the safeguarding of the non-bridged underlying layers, so that the safety argumentation for the second system reaction 56 is simplified. In this case, however, the second system reaction 56 must be designed and tested taking into account the underlying layers.

The hierarchical system architecture 100 according to the embodiment of FIG. 1 is explained in more detail below in order to deepen the understanding of the bottom-up safety mechanism implemented therein. FIG. 1 illustrates a possible signal flow plan or signal connection paths between the individual components of the hierarchical system architecture 100.

The present invention is independent of a specific layer architecture and differs with regard to the detectors and classic validation checks common in a top-down safety path from the top (performance layer 30) to the bottom (hardware layer 40) of the hierarchical system architecture 100.

In this case, FIG. 1 shows an extreme layered architecture, with the minimum required layers. In this FIGURE, the system layer architecture 100 consists of only three layers: a hardware layer 40, a safety layer 50 and a performance layer 30. The hardware layer 40 is safeguarded according to ISO 26262 and can provide raw sensor data. Furthermore, the hardware layer 40 can receive and implement commands from the layers thereabove, e.g. layers 30 or 50. The safety layer 50 bears the entire safety load and is therefore limited in complexity to a level that can be protected. The performance layer 30, on the other hand, bears no safety load at all and can therefore be arbitrarily complex and implemented, for example, using an end-to-end learning approach.

The safety layer 50 is further constructed as follows. It contains a test/check module 92 which checks an input or a generated and transmitted first control signal 60 of the performance layer 30 for validity. Two case scenarios must be distinguished:

If the input of the performance layer 30 is valid in a first case scenario, it is used as a reference for the planning module 94 of the safety layer 50, so that this planning module 94 outputs corresponding control signals 62, 64 to the underlying hardware layer 40, which follows the plan of the performance layer 30.

However, if in a second case scenario the input from the performance layer 30 is invalid, the safety layer 50 must offer a fallback solution for all possible cases in which the input may be invalid. In addition, the safety layer 50 must ensure that an invalid input does not go undetected under any circumstances. Accordingly, said safety layer must be optimized to avoid false negatives at the cost of an increased false positive rate. For checking and planning purposes, the safety layer 50 therefore requires its own safeguarded perception in the form of a perception module 90 and may only rely on information from this safeguarded perception.

A detector module 70 is part of the safety layer 50. In contrast to the check module 92, however, said detector module can also access an environment model optionally available in the performance layer 30 in order to check it for certain properties. While the check module 92 focuses on checking the validity of the input or the first control signal 60, the detector module 70 detects the presence of a special case of a detected driving situation of the vehicle 80 for which a specific system reaction is provided. Typically, this special case is characterized by the fact that the proposed fallback solution of the safety layer 50 is not satisfactory. However, this is only one of a plurality of possible evaluation criteria which can characterize a special case. The additional criteria limit and clearly specify the ODD of the special case. As a result, the specific second system reaction 56 no longer has to provide a solution to a so-called open-world problem, as the safety layer 50 of the hierarchical system architecture 100 must do.

Accordingly, even a complex system reaction can be safeguarded. Another difference from the check module 92 of the safety layer 50 is that a detector 70 is configured to avoid false positives. The corresponding second system reaction 56 is therefore only triggered if it is sufficiently ensured that the second system reaction 56 is a better solution than the fallback solution with the first system reaction 54 of the safety layer 50.

Due to the limited ODD, the complexity of the second system reaction 56 can be significantly more complex than the proposed first system reaction 54 of the planning module 94 of the safety layer 50, because said safety layer must be safeguarded for an open-world scenario. Accordingly, the second system reaction 56 is to be located outside the safety layer 50 in the performance layer 30. However, in contrast to the output of the performance layer 30, the output of the specific second system reaction 56 is safeguarded on the limited ODD thereof.

With reference to the signal flow, as indicated by way of example in the system architecture 100 of FIG. 1 with the corresponding reference signs, the following should also be stated:

First, the performance layer 30 is calculated, wherein the perception 90 of the safety layer 50 can be calculated in parallel therewith. The input of the performance layer 30 by means of the first control signal 60 is fed to the check module 92 of the safety layer 50, whereupon the planning module 94 of the safety layer 50 determines either a fallback behavior or planning out of the specified reference. The detector 70 follows this and triggers the corresponding second system reaction 56 for a detected special case (see signal connection 75 from detector 70 to reaction module 74), which second system reaction is ascertained in the reaction module 74 of the performance layer 30. This reaction module 74 is safeguarded in its limited ODD.

Depending on the result of the detector 70, one possibility is that the output of the planning 94 of the safety layer 50 is used directly, i.e. in the form of the originally proposed first system reaction 54 (normal case). If, however, the detector 70 detects a special case for the vehicle 80, the plan of the main signal path is overwritten by the special second system reaction 56 and, instead of the second control signal 62 for the first system reaction 54 to be implemented, a corresponding third control signal 64 is transmitted to the implementation module 98 of the hardware layer 40.

As already briefly explained at the outset, in the exemplary embodiment of FIG. 1, the safety layer 50 of the system architecture 100—but not the hardware layer 40, which provides sensor data in the form of a sensor module 96 to the layers above it when required—consists of a perception module 90, a test/check module 92 and a planning module 94 for planning a corresponding control command.

Alternatively, the performance layer 30 can have the same structure as the safety layer 50.

The hardware layer 40 comprises hardware components, e.g. sensors, actuators, computing units, as well as their low-level control software, e.g. firmware, device drivers, subordinate controllers. The hardware layer 40 is primarily safeguarded according to the principles of ISO26262 and provides appropriate redundancies.

The perception module 90 processes sensor data and prepares them for the action decision. The check module 92 checks the output of the perception module 90 and the input of the plan module 94 from the next higher performance layer 30. In particular, the check module 92 checks the input data for plausibility and consistency. If possible, the check module 92 corrects corrupted input data. In any case, however, the check module 92 of the safety layer 50 evaluates the input data or incoming control signals and forwards the evaluation together with the input data to the plan module 94 of the safety layer 94.

In the simplest case, such an evaluation is a binary decision as to which part of the input data can be used for planning. In more complex embodiments of a check module, probability measures or scores from a neural network can also be used. The planning module then plans the behavior of the automated vehicle based on the input data and the evaluation thereof. Depending on the layer and exemplary embodiment, such behavior can be represented in the form of a concrete instruction, e.g., "stop at the stop line," "cross the intersection," a set of boundary conditions, or a target trajectory, i.e. a sequence of target states of the host vehicle 80 over time.

The hierarchical system architecture 100 according to the present invention can be used in a wide variety of fields or applications.

In a first example, a system reaction for a crosswalk scenario is implemented in the bottom-up safety path. The top-down path initially provides the performance behavior "stop before the crosswalk." If this is not possible, the behavior of the vehicle degrades to stopping on the crosswalk, but in front of the pedestrian, with heavy braking. This fallback behavior is possible with less complex functionality than the performance path, which specifies a comfort-optimal behavior. However, if stopping in front of the pedestrian is no longer possible by emergency braking, a more complex evasive behavior is required. This requires the functional complexity of, for example, a motion layer. This situation is recognized by the detection mechanism, which now recognizes exactly this specific situation for the vehicle. The functionality thereof must be meticulously safeguarded. The more complex functionality, in turn, is limited to a clearly defined, highly restricted operational design domain so that despite the complexity of the functionality its safety can be ensured.

In a second example, a safety mechanism as explained in detail above with a corresponding bottom-up safety path can implement a corresponding system reaction for a so-called crash alignment. In the top-down main signal path, optimized stopping in front of the other road user is first automatically examined. If this is no longer possible, an emergency braking maneuver in front of said user is calculated. A detector detects when such emergency braking is no longer sufficient to prevent an accident. Furthermore, the bottom-up safety mechanism checks whether the other requirements are met under which a complex crash alignment module can correctly and safely fulfill its function. For this purpose, a detector must be meticulously safeguarded. If the detector detects this special case, the crash alignment is triggered so that the consequences of the accident are minimized.

In a third example, a system reaction is implemented in the bottom-up safety path for an intersection scenario with traffic lights, in which the host vehicle enters the intersection when the light is green, but then has to stop unexpectedly at the intersection because, for example, a vehicle in front has stopped behind the intersection contrary to expectations, so that the host vehicle can no longer drive through the intersection. Because the vehicles crossing the intersection only get the green light when the host vehicle is already stopped, the situation is not as critical as, for example, in the crosswalk scenario, where a wrong decision can cause serious accidents. For this scenario, a layered architecture is assumed which includes a context layer, an intent layer, a motion layer, a reflex layer, and a hardware layer, wherein the context layer is the highest arranged layer and the hardware layer is the lowest arranged layer in this architecture.

Accordingly, the safety load is reduced so that a detector in the motion layer can already intercept the situation, although the top-down path in an underlying reflex layer would still find a valid solution (e.g. direct hard braking to a standstill). The specific situation is detected by the detector, which triggers a reaction module in the context layer. Said reaction module determines the optimal stopping point so that the host vehicle hinders crossing vehicles as little as possible. This solution is then checked again by the reflex layer, so that the reflex layer would still trigger emergency braking if the trajectory of the reaction module does not withstand the collision test of the reflex layer. However, the check for compliance with traffic rules, which is located in the intent and motion layers, is overwritten.

The following summarized overview clearly shows further advantages of the bottom-up safety approach described above:

| Technical feature | Clear safety arguments (safety case) | Scalability | Verification and validation |
|---|---|---|---|
| Clear architecture: top-down safety mechanism through a layered architecture extended by bottom-up safety mechanisms | General safeguarding through the top-down safety mechanism. Supplemented by the specific bottom-up mechanism. | The architecture provides the interface for a systematic extension of the safeguarded system. | The architecture clearly separates the special cases from the standard cases. This simplifies the VER/VAL task |
| Detectors are central elements of the bottom-up safety mechanism. The detectors detect very specific unsafe situations and trigger a corresponding risk-reducing reaction within a higher layer. | Detectors are configured to avoid false positives because the top-down safety concept is in place and comes into effect if the detector detects a false negative. The combination of the two oppositely configured safety mechanisms increases safety. | The performance path (higher and more intelligent layers) can be more integrated when scaling to higher complexity or speed through the bottom-up mechanism. | Sensitivity to a specific situation means a very limited ODD. |
| Detectors are clear and compact. | The detectors are accessible to analytical consideration and can also be tested in simulations: the theoretical limits can be ascertained. | Many of these compact detectors can be developed in a short time, thus allowing the functionality to be scaled. | The detectors are accessible to analytical consideration and can also be tested in simulations: the corner cases are known. Very accessible to analytical software quality improvement methods (e.g. Scode). |

-continued

| Technical feature | Clear safety arguments (safety case) | Scalability | Verification and validation |
|---|---|---|---|
| Detectors are designed specifically for defined sub-areas of the ODD. This ensures that the higher-level layer is only triggered to execute a risk-reducing reaction in certain situations. | Precise definition of the task. Clear assignment to the ODD allows for statements about coverage of the safety objectives. | A desired extension of the ODD, e.g. elements which increase the complexity or an area in which faster driving is possible, can be specifically added in the safety concept. | The clear definition of the ODD allows for testability and targeted collection of endurance data. |
| The sub-areas of the ODD for which a detector is configured can be designed disjointly. | Clear cooperation of safety functions, no unwanted overlap or coordination gaps. | The reduced validation effort increases scalability. | By design, couplings are excluded. VAL possible through argumentation. |

What is claimed is:

1. A hierarchical system architecture for controlling an automated vehicle, the hierarchical system architecture comprising:

a performance layer;

a safety layer; and a hardware layer, wherein the safety layer is arranged between the performance layer and the hardware layer;

wherein the performance layer is configured to generate a first control signal and to transmit the first control signal to the safety layer;

wherein the safety layer is configured to detect whether a safety-critical driving situation is present for the vehicle, and a first system reaction is to be carried out in order to bring the vehicle into a safe state by transmitting a corresponding second control signal to the hardware layer instead of the first control signal; and wherein the safety layer includes at least one detector module which is configured to detect, based on an evaluation using at least one evaluation criterion, whether a special case is present in the safety-critical driving situation of the vehicle, the special case requiring an associated second system reaction instead of the first system reaction to achieve the safe state of the vehicle by transmitting a corresponding third control signal to the hardware layer instead of the corresponding second control signal;

wherein the second system reaction is carried out by a reaction module which is connected via signals to the detector module;

wherein the reaction module is located on a layer of the system architecture arranged above a layer on which the detector module is located.

2. The hierarchical system architecture according to claim 1, wherein the first system reaction is triggered based on a result of a validity check of the received first control signal.

3. The hierarchical system architecture according to claim 1, wherein the at least one evaluation criterion provides whether the first system reaction is sufficient to bring the vehicle into the safe state.

4. The hierarchical system architecture according to claim 1, wherein the detector module is configured to access the performance layer to obtain information which is used in the evaluation of the safety-critical driving situation of the vehicle.

* * * * *